Figure 4:
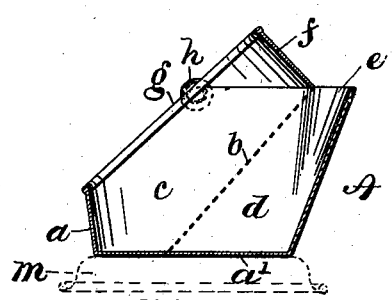

(No Model.)

F. P. BOLAND.
TEA OR COFFEE STRAINER.

No. 549,433. Patented Nov. 5, 1895.

Witnesses.
Fred Arnold
William Posells.

Inventor
Frank P. Boland.
by Remington & Hinthorn
Attys.

UNITED STATES PATENT OFFICE.

FRANK P. BOLAND, OF PROVIDENCE, RHODE ISLAND.

TEA OR COFFEE STRAINER.

SPECIFICATION forming part of Letters Patent No. 549,433, dated November 5, 1895.

Application filed March 7, 1895. Serial No. 540,848. (No model.)

*To all whom it may concern:*

Be it known that I, FRANK P. BOLAND, a citizen of the United States, residing at Providence, in the county of Providence and State of Rhode Island, have invented certain new and useful Improvements in Tea or Coffee Strainers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to "strainers," so called, and more particularly to strainers of the class which are adapted to be used for straining tea while it is being drawn or poured from a tea-pot.

Strainers of the type forming the subject of this invention were formerly constructed with a single chamber, wherein a portion of its wall—i. e., its delivery side—was perforated or reticulated and constituted the strainer proper. The objection to this primitive class of strainers was that after use in pouring out a cup of coffee or tea the drip from the saturated tea-leaves or coffee-grounds retained in the strainer would stain the table-cloth unless guarded against. This class of strainers therefore required the auxiliary use of a plate or saucer or some such article to receive the drip and protect the table-cloth therefrom. An improvement upon this class of devices was then made in which the strainer consisted of two compartments or chambers, one, the upper, corresponding to the single chamber of the primitive device, and the other, the lower, being a drip-chamber and serving first to receive the strained beverage and discharge it into the cup, and afterward, when the strainer was not in use, to receive and collect the drip from the tea-leaves or coffee-grounds. One serious drawback, however, has been found to exist in this class of devices as hitherto constructed. This is the difficulty with which the tea-leaves or coffee-grounds are removed from the sieve or reticulated portion. It has not been found possible to do this without making the strainer of two separable portions—that is, to make the strainer proper removable from the drip-chamber—for if made all in one piece, with the parts arranged as they have hitherto been, a flow of water could not well be applied to the back of the sieve to wash the grounds or leaves from the front portion thereof, and such strainers have not hitherto been constructed so that a flow of water could be applied to the front portion, which would carry the grounds away from the sieve and out of the strainer. Now it is of vital importance for the success of an article of this character, that it should be used and cleaned with the least possible trouble. Hence it has hitherto been considered indispensable for this purpose that the device should be made in two parts or with a removable strainer.

Now I have discovered a novel arrangement of the parts by which the device may be readily cleaned and the grounds or leaves may be readily removed, yet without making the device in two parts or making the strainer proper removable. By this means I provide an article more convenient to use, being all in one piece, and cheaper to manufacture, as requiring less material and less labor and time to put together.

The construction and arrangement whereby I attain the above results and other advantageous results incidental thereto I will now particularly describe.

Figure 1:
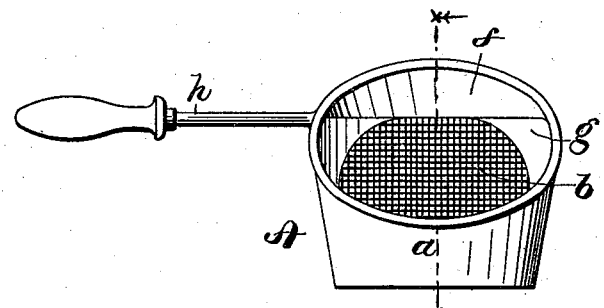
Figure 3:
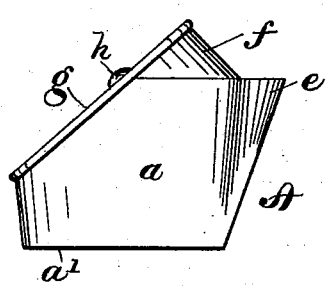
Figure 2:
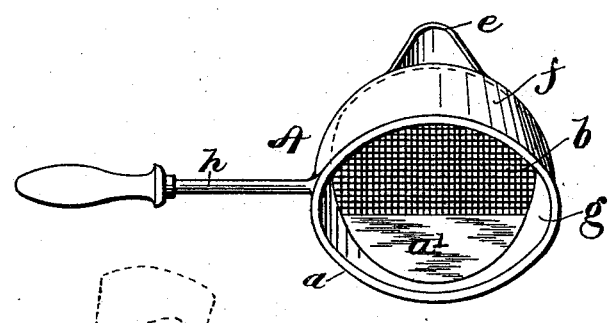
Figure 5:
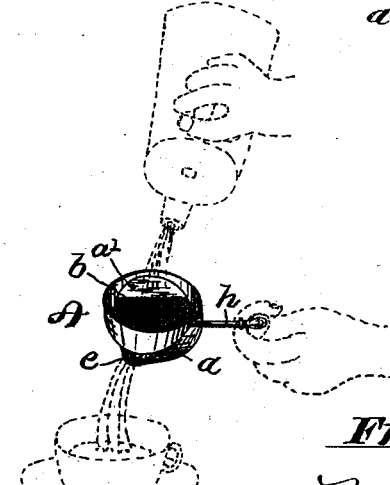

In the accompanying sheet of drawings, Figure 1 is a front elevation showing my improved strainer. Fig. 2 is a plan view. Fig. 3 is a side view. Fig. 4 is a transverse sectional view taken on line $x\,x$ of Fig. 1, and Fig. 5 shows the manner of holding the strainer as in use.

A, referring to the drawings, designates my improved tea-strainer complete. The body or vessel portion $a$ has a flat bottom or base $a'$ and well flaring or beveled sides. It is divided interiorly into two chambers $c$ and $d$ by a suitably perforated or reticulated partition $b$, forming the strainer proper, arranged at an angle and extending from top to base of the body portion. The plane of the upper face $g$ of the inlet or receiving chamber $c$ is substantially parallel with said partition $b$. The upper or forward side $f$ forms a hood or protector and is joined to and intersects the sides of the body $a$.

The front central part of the vessel $a$ is provided with a discharge spout or nose $e$, the same extending somewhat beyond the base of the hood $f$ at that point. The outlet-chamber $d$ is in direct communication with the spout $e$, and the said two chambers $c$ $d$ intercommunicate through the strainer $b$. The whole forms a drip-retaining chamber, although all the tea-grounds or "screenings" are collected and retained in the inlet or rear chamber $c$. At or near the top of the vessel $a$ is secured a laterally-extending handle $h$. It will now be seen that by holding the device so that the partition $b$ shall be turned nearer to the vertical the small portion of the base $a'$, which constitutes a portion of the receiving-chamber $c$, will be inclined to the horizontal, so that when water is poured upon the front side of the sieve $b$ it will carry the grounds down and out of contact with said sieve and into the corner formed by said portion of the base $a'$ and the side of the vessel, and as these are made of smooth metal, instead of being reticulated, the grounds will be readily washed out therefrom by a continued flow of water. Thus the device is very readily cleaned without the necessity of taking it apart or of making it in separable parts.

Another advantage attendant upon my construction is as follows: The sieve or strainer proper being a flat piece of wire-netting inclined at a considerable angle to the bottom of the drip-chamber when the device is set down after pouring, the grounds or leaves will fall down the inclined partition $b$ into the lower corner of the receiving-chamber. When the strainer is used again, the grounds or leaves will not return to the portion of the sieve upon which the liquid is poured. This is an important advantage, for in all dripless strainers that have come to my knowledge the construction is such that the grounds or leaves from every preceding pouring accumulate precisely at the point where the beverage is poured, and the latter has to pass through the accumulations of grounds of all the cups hitherto poured out. In pouring tea or coffee for a large number of persons this is very objectionable. I believe that my improved construction is the first in which the grounds or leaves fall out of the way of the next pouring and remain out of the way. A further advantage may here be mentioned as arising from providing a dripless strainer all in one piece instead of in two pieces, as hitherto, which is that the device may be vigorously jerked bottom upward, so as to empty the grounds or leaves into a suitable basin when necessary without any fear of jerking out the strainer proper, a very annoying incident at the tea-table, liable to happen with strainers as at present constructed.

I may state that while my improved dripless strainer may be made of sheet-tin or other comparatively-inexpensive and readily-workable metal it may be made of silver, &c., and if desired it may be made highly ornamental, its cost obviously being correspondingly increased. In some cases the base may be enlarged in any suitable manner, or as indicated by dotted lines at $m$, Fig. 4.

In use it will be seen by referring to Fig. 5 that the tea is poured directly from the nose of the teapot onto the partition $b$, and from the latter it flows therethrough into the cup *via* the spout $e$, the operator at the same time holding the device at an angle. The strainer after being used can be placed directly upon the table-cloth without fear of soiling the latter, since all drip, &c., are collected and retained in the vessel. The latter may be easily emptied of the drip before the next cup of tea is drawn. This, however, could not be done if the strainer were constructed and attached to the pot-nose, as common, as the act of tipping the pot to pour the tea also depresses the strainer.

I claim as my invention—

The improved dripless tea or coffee strainer, comprising a body portion open on top and having closed sides and a closed bottom and a spout through the side, and a perforated partition or strainer proper having its upper end above said spout, and continuously inclined downwardly from said spout, said body portion having its side opposite said spout cut away on a plane substantially parallel to said partition, and its side next and above said spout substantially at right angles to said partition, substantially as described.

In testimony whereof I have affixed my signature in presence of two witnesses.

FRANK P. BOLAND.

Witnesses:
GEO. H. REMINGTON,
HAROLD SENIOR.